(No Model.)
E. S. BARTHOLOMEW & J. LAW.
Grain Drill and Broadcast Seeder.
No. 242,862. Patented June 14, 1881.
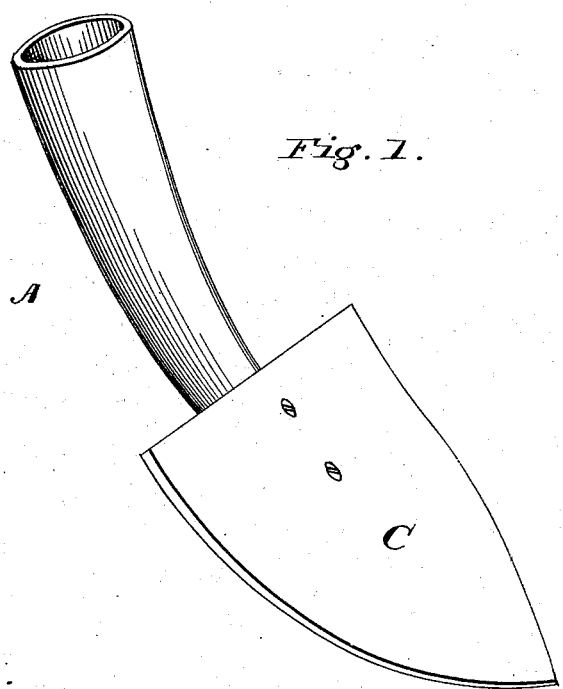
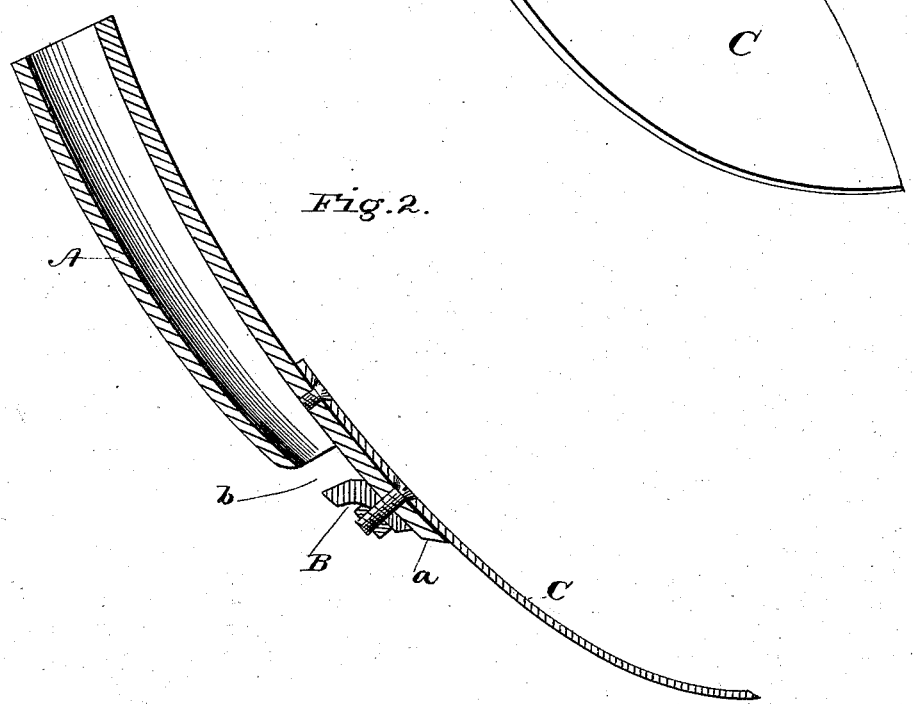
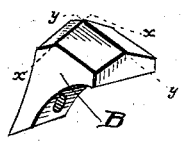
Attest:
W. H. H. Knight,
W. Blackstock.
Inventors:
Esli S. Bartholomew
and James Law.
by Hill & Church,
their Attys.

UNITED STATES PATENT OFFICE.

ESLI S. BARTHOLOMEW AND JAMES LAW, OF MANKATO, MINNESOTA; SAID BARTHOLOMEW ASSIGNOR TO WILLIAM LAW, OF MADELIA, MINN.

GRAIN-DRILL AND BROADCAST-SEEDER.

SPECIFICATION forming part of Letters Patent No. 242,862, dated June 14, 1881.

Application filed January 15, 1881. (No model.)

To all whom it may concern:

Be it known that we, ESLI S. BARTHOLOMEW and JAMES LAW, both of Mankato, Blue Earth county, Minnesota, have invented certain new and useful Improvements in Grain-Drills and Broadcast-Seeders; and we do hereby declare the following to be a full, clear, and exact description of the same, reference being had to the accompanying drawings, forming part of this specification, in which—

Figure 1 is a perspective view of the invention when adapted for use as a broadcast-drill. Fig. 2 is a longitudinal sectional view of the same, and Fig. 3 a perspective view of the distributer detached.

Similar letters of reference in the several figures denote the same parts.

This invention has for its object to improve the construction and operation of grain-drills and broadcast-seeders, and is especially directed to the improvement of the devices for delivering the grain or seed to the ground.

To this end the invention consists in the novel construction and arrangement of parts constituting such delivery devices, which we will now proceed to describe.

In the drawings, A represents the tube or hollow leg through which the grain or seed is conducted from the hopper or reservoir of the drilling or seeding machine to the ground. This tube is preferably curved, as shown in Fig. 2, and the forward portion of its lower end is extended, as seen at $a$, and to it is secured, by screw-bolts or otherwise, a distributing-block, B, and also, for some purposes, a shovel or tooth, C. The position of the distributing-block is such that it practically closes the lower end of the tube, leaving only an opening, $b$, at the rear for the escape of the grain or seed. The advantage of this arrangement is, that the filling up of the tube with mud is prevented when passing through soft places, especially in early spring-seeding, and an unobstructed passage for the grain or seed is always preserved. The upper surface of the distributing-block is preferably made curved or beveled, in order that the grain or seed falling upon it may be spread out or distributed evenly in the furrow, instead of dropping altogether in a mass, as ordinarily. The best results have been obtained by beveling the block both ways longitudinally from the line $xx$, and then again both ways laterally from the line $yy$, as shown in Fig. 3.

When the device is to be used for broadcast-drilling a broad shovel, such as shown in Fig. 1, is employed, in order that a very wide furrow may be made, and that the seed be distributed low down under it in a broadcast form. For broadcast-seeding without drilling, the shovel C is removed, while for common drilling the broad shovel C is removed and a narrow tooth or shovel substituted.

If desired, the distributing-block may be so attached as to be capable of being adjusted up and down, to increase or diminish the size of the opening for the discharge of the grain.

We are aware that it is not new in grain-drills to provide at the bottom of the drill-tooth a plate or block for distributing and spreading the grain in the furrow, and also that it is not new to discharge the grain from the tooth rearwardly instead of forwardly into the furrow, and such constructions and features we do not claim, broadly, as our invention; but What we do claim is—

The combination, with the hollow leg or tube A, having the forward extension, $a$, of the distributing-block B, secured to said forward extension, and having its upper face beveled longitudinally both ways from the line $xx$, and also beveled both ways laterally from the line $yy$, whereby the seed or grain is directed rearward and properly distributed, and whereby, also, the entrance of soft mud or earth into the tube is prevented, substantially as described.

ESLI S. BARTHOLOMEW.
JAMES LAW.

Witnesses to Esli S. Bartholomew's signature:
H. F. SHAW,
H. MCMURTRIE.

Witnesses to James Law's signature:
W. MACKLEM,
W. J. HUSE.